US012526698B2

(12) United States Patent
Roeland et al.

(10) Patent No.: US 12,526,698 B2
(45) Date of Patent: Jan. 13, 2026

(54) METHOD FOR CONFIGURING DATA SESSIONS FOR A USER EQUIPMENT

(71) Applicant: Telefonaktiebolaget LM Ericsson (PUBL), Stockholm (SE)

(72) Inventors: Dinand Roeland, Sollentuna (SE); Göran Eriksson, Norrtälje (SE); Stefan Håkansson, Gothenburg (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 477 days.

(21) Appl. No.: 17/755,657

(22) PCT Filed: Nov. 6, 2019

(86) PCT No.: PCT/SE2019/051115
§ 371 (c)(1),
(2) Date: May 4, 2022

(87) PCT Pub. No.: WO2021/091439
PCT Pub. Date: May 14, 2021

(65) Prior Publication Data
US 2022/0369170 A1    Nov. 17, 2022

(51) Int. Cl.
*H04W 36/32*    (2009.01)
*H04W 36/00*    (2009.01)

(52) U.S. Cl.
CPC ...... *H04W 36/0011* (2013.01); *H04W 36/328* (2023.05)

(58) Field of Classification Search
CPC ................. H04W 36/0011; H04W 36/328
(Continued)

(56) References Cited

U.S. PATENT DOCUMENTS

2018/0192390 A1    7/2018  Li et al.
2018/0199398 A1    7/2018  Dao et al.
(Continued)

FOREIGN PATENT DOCUMENTS

CN    109121170 A    1/2019
CN    109743742 A    5/2019
(Continued)

OTHER PUBLICATIONS

Notice of First Examination Opinion issued for Chinese Application No. 201980103467.X—Feb. 28, 2024.
(Continued)

*Primary Examiner* — Sibte H Bukhari
(74) *Attorney, Agent, or Firm* — Baker Botts L.L.P.

(57) ABSTRACT

The present disclosure relates to method performed by a control node (SMF) configured to configure data sessions for a user equipment, UE, wherein at least one first data session is established by a first User Plane Function, UPF, node (UPF1) and the first data session (DS1) is connected via a first wireless access node (gNB_Source) associated to a first geographical area (UPF_area1) of the first UPF node (UPF1), the method comprising receiving, from a service node (NWDAF), a first notification (508) of predicted geographical area mobility of the UE, the first notification (508) being directly or indirectly indicative of a plurality of predicted target wireless access nodes (WN3, WN4) indicated as potential target access nodes for the UE, processing the first notification (509), and determining if connecting the UE to any one of the plurality of predicted target wireless access nodes (WN3, WN4) comprises a change to an associated geographical area (UPF_area2) different to the first geographical area (UPF_area1), transmitting, to the first wireless access node (gNB_Source), a data session modification request (512) comprising the processed first notifica-
(Continued)

tion, the data session modification request being indicative of a request to transfer the at least one first data session (DS1) to any one of the plurality of predicted target wireless access nodes (WN3, WN4), receiving, from the first wireless access node (gNB_Source), a data session establishment response (516) comprising a selected wireless access node (gNB_Target) of the plurality of predicted target wireless access nodes, the selected wireless access node (gNB_Target) being associated to a second geographical area (UPF_area2), configuring at least one second data session (DS2), to be connected via the selected wireless access node (gNB_Target), by sending, to a second User Plane Function, UPF node (UPF2) serving the second geographical area (UPF_area2), a data session establishment request (518), receiving, from the selected wireless access node (gNB_Target), a second notification (530) indicative of a transfer of the UE from the first wireless access node (gNB_Source) to the selected wireless access node (gNB_Target), and releasing (534) the first data session (DS1).

12 Claims, 11 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2019/0158985 A1 | 5/2019 | Dao et al. | |
| 2019/0289505 A1* | 9/2019 | Thomas | ................ H04W 68/04 |
| 2019/0335534 A1 | 10/2019 | Atarius et al. | |

FOREIGN PATENT DOCUMENTS

| | | | | |
|---|---|---|---|---|
| CN | 109845390 A | * | 6/2019 | ........ H04W 72/1205 |
| CN | 110192406 A | | 8/2019 | |
| EP | 3 557 905 A1 | | 10/2019 | |
| KR | 20190086740 A | * | 7/2019 | |
| WO | WO2018174503 A1 | | 9/2018 | |
| WO | 2018 205100 A1 | | 11/2018 | |
| WO | WO2019160546 A1 | | 8/2019 | |

OTHER PUBLICATIONS

3GPP TS 23.502 v16.2.0; Technical Specification; 3rd Generation Partnership Project; Technical Specification Group Services and System Aspects; Procedures for the 5G System (5GS); Stage 2 (Release 16)—Sep. 2019.
SA WG2 Meeting #129; Dongguan, China; Source: ZTE; Title: Solution to Key issue#11 (S2-1810596 (revision of S2-18xxxx))—Oct. 15-19, 2018.
3GPP TSG-SA WG2 Meeting #130; Kochi, India; Source: KDDI, Toyota ITC; Title: 7.4 NWADF-assisted Background Data Transfer (S2-1901063 (revision of S2-1900079))—Jan. 21-25, 2019.
PCT International Search Report issued for International application No. PCT/SE2019/051115—Aug. 4, 2020.
PCT Written Opinion of the International Searching Authority issued for International application No. PCT/SE2019/051115—Aug. 4, 2020.
Examination Report issued by Intellectual Property India for Application No. 202217029731—Sep. 26, 2022.
EPO Communication pursuant to Article 94(3) EPC issued for Application No. 19 805 784.6-1215—Sep. 17, 2024.
India Patent Office, Official Action, Hearing Notice, in India Application No. 202217029731 dated May 7, 2025 (with translation).

* cited by examiner

CONTINUED IN Fig. 6A

METHOD FOR CONFIGURING DATA SESSIONS FOR A USER EQUIPMENT

PRIORITY

This nonprovisional application is a U.S. National Stage Filing under 35 U.S.C. § 371 of International Patent Application Serial No. PCT/SE2019/051115 filed Nov. 6, 2019 and entitled "Method for Configuring Data Sessions For a User Equipment" which is hereby incorporated by reference in its entirety.

TECHNICAL FIELD

The present invention relates to a method for controlling data sessions for a user equipment, UE. The invention further relates to a computer device performing the method.

BACKGROUND

In wireless networks, e.g. 3GPP standardized Networks, data sessions are typically established via a User Plane Function, UPF, node between an application server node and a User Equipment, UE, via one or more wireless access nodes. The UE can then access any number of services provided by the application server nodes.

As the UE moves around in the geography, the serving wireless node will typically change. When the UE moves between wireless nodes associated to the same geographical area, e.g. a UPF area, a current User Plane Function, UPF, node and the data session may remain the same. However, in some cases such as low-latency use cases where the UPF is placed on an edge and when the UE moves between wireless nodes associated to different geographical areas, e.g. different UPF areas, the data session needs to be modified or changed to the UPF node handling data sessions in the new geographical area.

This change of UPF node may be referred to as UPF node re-selection. A problem with this procedure is that data flow over the data session is interrupted or delayed.

There is therefore a need for an automatic solution that will provide for an improved UPF node re-selection.

SUMMARY OF THE INVENTION

Several advantages are achieved by the subject matter described herein. Further advantageous implementation forms of the invention are described herein.

According to a first aspect of the invention, a method performed by a control node configured to configure data sessions for a user equipment, UE, wherein at least one first data session is established by a first User Plane Function, UPF, node and the first data session is connected via a first wireless access node associated to a first geographical area of the first UPF node, the method comprising receiving, from a service node, a first notification of predicted geographical area mobility of the UE, the first notification being directly or indirectly indicative of a plurality of predicted target wireless access nodes indicated as potential target access nodes for the UE, processing the first notification, and determining if connecting the UE to any one of the plurality of predicted target wireless access nodes comprises a change to an associated geographical area different to the first geographical area, transmitting, to the first wireless access node, a data session modification request comprising the processed first notification, the data session modification request being indicative of a request to transfer the at least one first data session to any one of the plurality of predicted target wireless access nodes, receiving, from the first wireless access node, a data session establishment response comprising a selected wireless access node of the plurality of predicted target wireless access nodes, the selected wireless access node being associated to a second geographical area, configuring at least one second data session, to be connected via the selected wireless access node, by sending, to a second User Plane Function, UPF node serving the second geographical area, a data session establishment request, receiving, from the selected wireless access node, a second notification indicative of a transfer of the UE from the first wireless access node to the selected wireless access node, and releasing the first data session.

The advantages of the first aspect that a more efficient user plane selection mechanism is achieved by predicting geographical area mobility of the UE. In one example, predicting mobility saves resources that would otherwise be used to establish a what later turns out to be an incorrect user plane allocation, and to revoke these incorrect actions.

According to a second aspect of the invention, a method performed by a service node configured to predict mobility of a user equipment, UE, between geographical areas, the method comprising predicting geographical area mobility of the UE by predicting a list of access nodes and/or predicting a list of geographical areas, each geographical area comprising a User Plane Function, UPF, area and being associated to a corresponding list of access nodes, wherein the predicted list of access nodes or corresponding list of access nodes are indicated as potential target access nodes for the UE, wherein the predicting is performed using a trained model, sending, to a control node, a first notification directly or indirectly indicative of the plurality of predicted target wireless access nodes.

According to a third aspect of the invention, a method performed by a wireless access node configured to connect to a user equipment, UE, the wireless access node being associated to a first geographical area, the method comprising receiving, from a control node, a data session modification request, the data session modification request being indicative of a request to transfer the at least one first data session to any of a plurality of target wireless access nodes, selecting a target wireless access node from the plurality of target wireless access nodes based on a set of conditions, or selecting the target wireless access node from an alternative plurality of target wireless access nodes, sending a data session establishment response comprising the selected wireless access node, transferring the UE from the first wireless access node to the selected wireless access node, sending a notification indicative of the transfer of the UE from the first wireless access node to the selected wireless access node.

According to a fourth aspect of the invention, a control node configured to configure data sessions for a user equipment, UE, wherein at least one first data session is established by a first User Plane Function, UPF, node and the first data session is connected via a first wireless access node associated to a first geographical area of the first UPF node, the control node comprising processing circuitry, a memory comprising instructions executable by the processing circuitry, causing the processing circuitry to receive, from a service node, a first notification of predicted geographical area mobility of the UE, the first notification being directly or indirectly indicative of a plurality of predicted target wireless access nodes indicated as potential target access nodes for the UE, process the first notification, and determining if connecting the UE to any one of the plurality of predicted target wireless access nodes comprises a change to an associated geographical area different to the first geographical area, transmit, to the first wireless access node, a data session modification request comprising the processed first notification, the data session modification request being indicative of a request to transfer the at least one first data session to any one of the plurality of predicted target wireless access nodes, receive, from the first wireless access node, a data session establishment response comprising a selected wireless access node of the plurality of predicted target wireless access nodes, the selected wireless access node being associated to a second geographical area, configure at least one second data session, to be connected via the selected wireless access node, by sending, to a second User Plane Function, UPF node serving the second geographical area, a data session establishment request, receive, from the selected wireless access node, a second notification indicative of a transfer of the UE from the first wireless access node to the selected wireless access node, and release the first data session.

According to a fifth aspect of the invention, a service node configured to predict mobility of a user equipment, UE, between geographical areas, the service node comprising processing circuitry, a memory comprising instructions executable by the processing circuitry, causing the processing circuitry to predict geographical area mobility of the UE by predicting a list of access nodes and/or predicting a list of geographical areas, each geographical area comprising a User Plane Function, UPF, area and being associated to a corresponding list of access nodes, wherein the predicted list of access nodes or corresponding list of access nodes are indicated as potential target access nodes for the UE, wherein the predicting is performed using a trained model, send, to a control node, a first notification directly or indirectly indicative of the plurality of predicted target wireless access nodes.

According to a sixth aspect of the invention, a wireless access node configured to connect to a user equipment, UE, the wireless access node being associated to a first geographical area, the wireless access node comprising processing circuitry, a memory comprising instructions executable by the processing circuitry, causing the processing circuitry to receive, from a control node, a data session modification request, the data session modification request being indicative of a request to transfer the at least one first data session to any of a plurality of target wireless access nodes, and send a data session establishment response.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
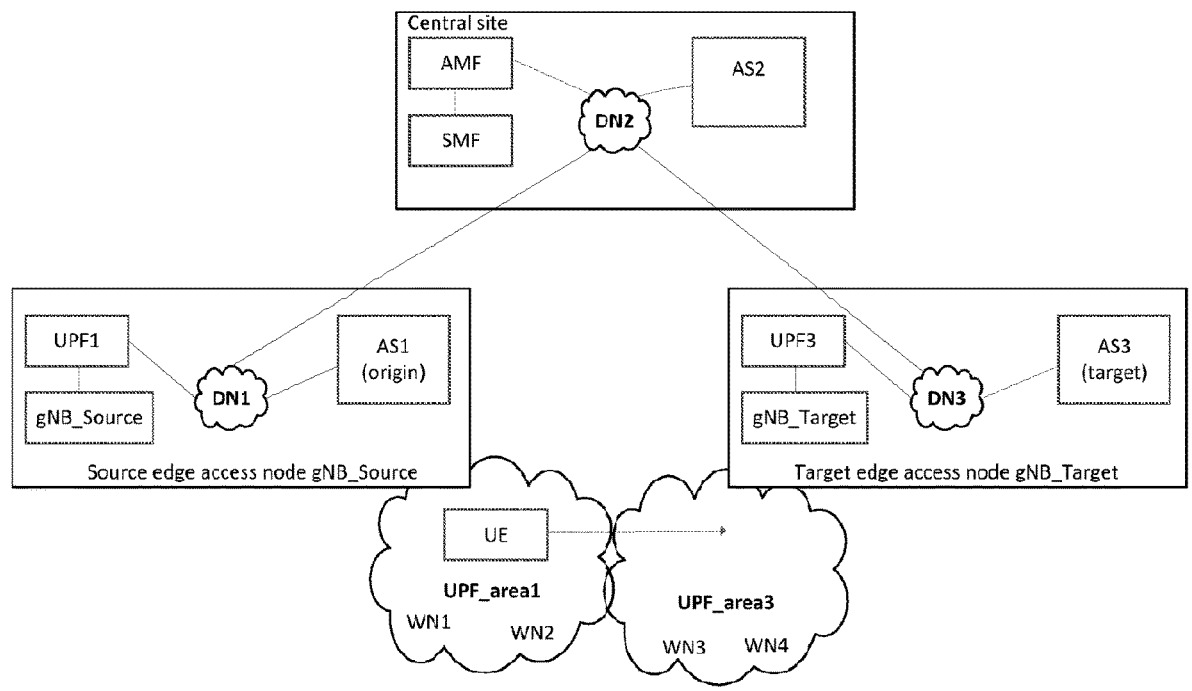
FIG. 1 shows a scenario according to one or more embodiments of the present disclosure.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In this disclosure the term "wireless access" denotes communication over a wireless or radio system. 3GPP systems offer different radio access systems. Some radio access systems are capable (depending on the deployment) to provide higher uplink data rates than others. For example, when a device is connected via the new NR radio access network, much higher data rates will be possible than using existing HSPA or GERAN radio access networks. There exists handovers within one radio access network (e.g. within NR) or even between radio access networks (e.g. from NR to HSPA), e.g. a user equipment, UE, moves from one serving wireless access node to a target wireless access node.

3GPP QoS framework specifies a Guaranteed (Flow) Bitrate (G(F)BR), a Maximum (Flow) Bitrate (M(F)BR), an Allocation and Retention Priority (ARP), and additional QoS Class Indicators (QCI/5QI). Each QCI defines a priority level (PL), a maximal latency and a maximal packet loss rate for the QoS flow.

In 3GPP systems, Quality of Service, QoS, bearers are requested via the Policy Control Function PCF/Policy Control and Charging Rules Function PCRF. Typically network nodes interact with the PCF/PCRF for QoS.

In this disclosure the term "communications network" or "interconnecting network" may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In the present disclosure, the term "wireless devices" or "User Equipment (UE)" denotes any type of wireless device communicating with a node and/or with another wireless device in a wireless/cellular or mobile communication system. Examples of wireless device include a mobile phone, a smart phone, a personal data assistant (PDA), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device may also be referred to as UE, a station (STA), a device, or a terminal in some embodiments. Also, in some embodiments, generic terminology, "radio network node" (or simply"network node") is used. It can be any kind of network node, which may comprise a Node B, base station (BS), multi-standard radio (MSR) radio node such as MSR BS, eNode B, gNodeB, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices, network nodes, and other network nodes (such as radio network controller or core network node) are described in more detail below. Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to 5G NR, LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

In this disclosure the term "data session" or "data flow" denotes e.g. a Protocol Data Unit (PDU) session being a logical connection between the UE and data network, typically an application server from which a UE is receiving one or more services. In other words, the data network is e.g. Internet. It hosts many application servers. Each server may provide one or more services. There are typically many data flows between a UE and an application server. E.g. a data session for an ongoing upload of a picture, a data session for an ongoing download of a movie, a data session for an ongoing voice call, etc. It all depends on the application. For some applications there may be hundreds of data session active simultaneously Session management and service continuity. PDU session: UE receives services through a Protocol Data Unit (PDU) session, which is a logical connection between the UE and data network.

PDU Session Type (i.e. IPv4, IPv6, IPv4v6, Ethernet Type or Unstructured Type) and if applicable, the static IP address/prefix.

The 3GPP Network Data Analytics Functions (NWDAF) hosts several services related to network data analytics. For example, a service function (SF) can subscribe to an NWDAF service for providing network slice congestion events. See 3GPP TS 23.288 for a list of services currently available in the NWDAF.

The specification for the NWDAF is under development in 3GPP, and multiple services are expected to be added. Some of these may be standardized, some may be kept proprietary.

The present disclosure proposes an Artificial Intelligence (AI) model for the NWDAF that can predict the next serving radio base station or wireless access node (gNB in 5G terminology) for a moving user device (UE, user equipment). This model can for example be used to optimize paging, or to optimize selection of user plane function (UPF) instances. 3GPP TS 23.501 provides more details on NWDAF node, User Plane Function node (UPF), Access Management Function (AMF), Session Management Function (SMF), and the (non-AI) UPF selection function in the SMF.

The present disclosure proposes a way to correlate mobility predictions with live measurement data observed in RAN, to come to better conclusions on when and where to select a target user plane or UPF.

This results in the advantage to achieve a more efficient user plane selection mechanism where prediction is used. A further advantage of using prediction is that a handover procedure partly be done before the actual radio base station handover (of the first connection) happens. This means that certain preparations can be done beforehand, instead of when the handover happens. This saves a bit of time, and thereby makes the handover procedure smoother.

FIG. 1 shows a scenario according to one or more embodiments of the present disclosure. In a typical example scenario, the UE has initially an established data session, connected via a Data Network (DN1), to the closest application server AS1 via a source edge wireless access node gNB_Source. The data session between AS1 and the UE is established by the source User Plane Function, UPF, node UPF1 having/being responsible for/being associated to a geographical UPF area comprising a plurality of wireless access nodes. The date session establishment is typically controlled by a Session Management function, SMF. Such geographical areas or UPF areas may be overlapping with other UPF areas, i.e. some wireless access nodes may be associated to or comprised in multiple geographical areas or UPF areas.

As the UE is mobile, the UE may move to an area served by a next edge wireless access node gNB_Target. If the gNB_Target is associated to a new UPF area or an UPF area different to the UPF area of UPF1, the move implies firstly a radio handover from gNB_Source to gNB_Target. The move also involves an UPF re-selection from the source UPF node UPF1 to the target UPF node UPF3 as well as an application server change from the source application server AS1 to a target application server AS3, possibly also spawning new Asset as a service/Infra-structure As A Service, IaaS, resources.

The procedure of the UPF re-selection will introduce delays and/or reduction in data transfer rate in the data session.

The present disclosure provides an improved UPF re-selection process by providing an early notification that a move to a target gNB associated to a new UPF area is imminent. This provides the advantage to make the move from gNB_Source to gNB_Target, the move from source UPF node UPF1 to the target UPF node UPF3 I.e. the move between UPF areas and the move from source application server AS1 to a target application server AS3 smoother and more efficient.

See 3GPP TS 23.501 V16.2.0 (2019 September) for further definitions of NWDAF, UPF, AMF, SMF, and the (non-AI) UPF selection function in the SMF.

Figure 2:
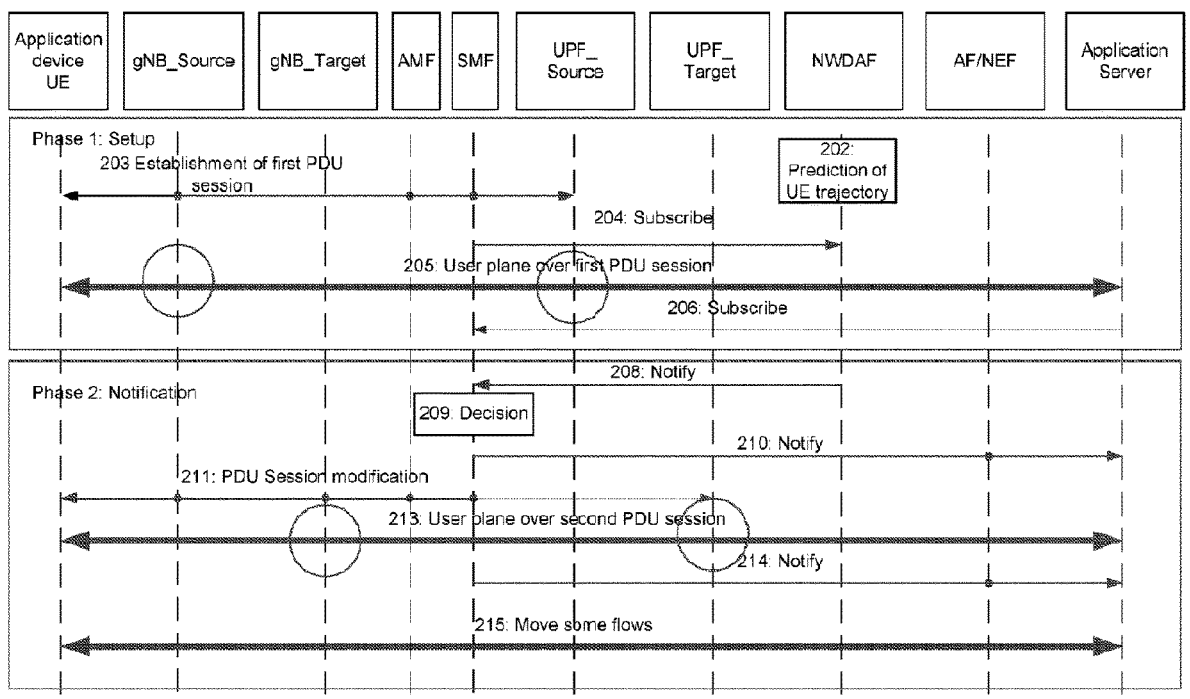
FIG. 2 Illustrates phases of the method according to one or more embodiments of the present disclosure.

FIG. 2 Illustrates phases of the method according to one or more embodiments of the present disclosure. Three phases can be distinguished, two phases shown in FIG. 2 and a third phase shown in FIG. 3.

In a first phase, Phase 1 Setup: The UE establishes or triggers establishment 203 of a first data/PDU session. The NWDAF then starts to predict 202 the UE trajectory, i.e. likely future serving wireless access nodes and/or likely future serving UPFs and geographical/UPF areas. The SMF then subscribes 204 for notifications of upcoming UPF area changes.

User plane traffic is then sent 205 over the first PDU session. In FIG. 2, the circles indicate via which nodes the packets go.

A message 206 is then sent from the AS to the SMF, via the AF indicated with a circle. The message is a request to receive notifications when the UPF will change (or has changed). So these are the notify messages (210 indicating that a decision has been made, 214 indicating that a second session is now available, 219 indicating that the radio handover of the first session has happened).

In a second phase, Phase 2 Notification, the NWDAF notifies 208 SMF about an upcoming UPF area change. The SMF then notifies 210 the application running on the UE and the application running on the application server, that a decision 209 has been made. The UE then establishes or triggers 211 establishment of a second data/PDU session. User plane traffic is then sent 213 over the second PDU session. In FIG. 2, the circles indicate via which nodes the packets go. A notification 214 is then sent from the SMF, via the AF/NEF, to the application server, indicating that the second data session is now available.

The application running on the UE and/or running on the application server then moves 215 some or a part of the data flows, e.g. using MP-TCP or QUIC.

Figure 3:
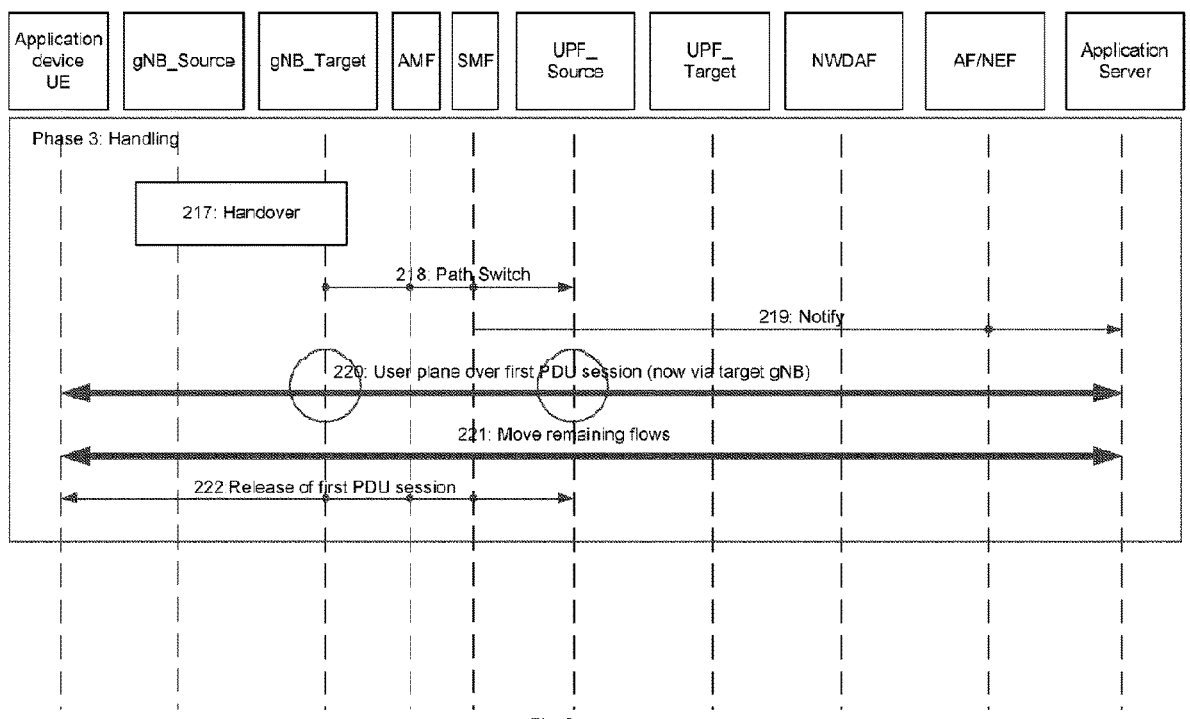
FIG. 3 Illustrates phases of the method according to one or more embodiments of the present disclosure.

Further description of the method is provided in FIG. 3

FIG. 3 Illustrates phases of the method according to one or more embodiments of the present disclosure. Three phases can be distinguished, two phases shown in FIG. 2 and a third phase shown in FIG. 3.

In a third phase, Phase 3 Handling, a Radio Access Network, RAN, a handover decision 217 is made and a handover 218 is performed from the source wireless access node gNB_Source to the target wireless access node gNB_Target. Performing the handover includes (amongst others) providing information on the target gNB that was selected. This information is sent from the target gNB to the SMF via the AMF. The SMF then re-configures the UPF, such that the UPF will start sending incoming downlink traffic to the right gNB (that is, the target gNB). Otherwise the UPF would continue to send downlink traffic to the source gNB.

A notification 219 is then sent from the SMF, via the AF/NEF, to the application server, indicating that the radio handover of the first session has happened.

The application running on the UE and/or running on the application server then moves remaining data flows. The UE or network (SMF) then releases 222 the first data/PDU session.

The disclosed solution uses dual PDU connectivity, i.e. the ability to have multiple PDU sessions established simultaneously. The disclosed solution further uses dual radio connectivity, i.e. the ability to connect to multiple wireless access nodes or radio base station simultaneously. With the feature of Dual radio Connectivity, e.g. as described in 3GPP TS 23.501 version 16.2.0, the first data/PDU session is established over the source wireless access node gNB_Source and source UPF UPF_Source, typically located in the source wireless access node site. The second PDU session is established over the target wireless access node gNB_Target and target UPF UPF_Target. At a later stage, the RAN handover from the source wireless access node gNB_Source to the target wireless access node gNB_Target moves the first PDU session from the source wireless access node gNB_Source to the target wireless access node gNB_Target. The effect or advantage of the proposed solution is that each data/PDU session experiences the lowest possible latency towards the data network DN at any time. In other words, reduces impact of data interruption, data transfer latency and any data throughput reduction due to UPF re-selection.

The disclosed solution also works in Single Connectivity. In this case, the first data/PDU session is established over the source wireless access node gNB_Source and source UPF UPF_Source, typically located in the source wireless access node site.

Figure 4:
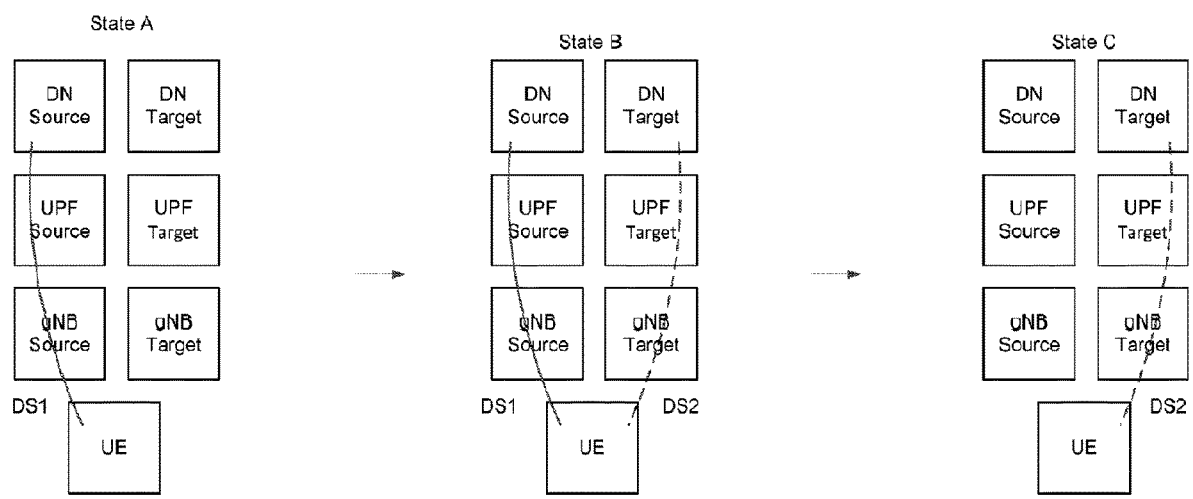
FIG. 4 Illustrates examples of how data sessions are moved according to one or more embodiments of the present disclosure.

The second data/PDU session is then established over the gNB in the source wireless access node gNB_Source and target UPF UPF_Target. Later, the RAN handover moves both first and second sessions from the target source UPF UPF_Source to the target UPF UPF_Target. In this case, the second PDU session experiences the lowest possible latency only after handover FIG. 4 Illustrates examples of how data sessions are moved according to one or more embodiments of the present disclosure. During a UPF re-selection, the present disclosure presents a solution that goes through three states A, B and C.

In state A, the first data session DS1 (shown as a solid line) is established over the source wireless access node gNB_Source, source UPF UPF_Source and source data network DN_Source.

In state B, the first data session DS1 remains established over the source wireless access node gNB_Source, source UPF UPF_Source and source data network DN_Source. The second PDU session DS2 (shown as a dashed line) is then established over the target wireless access node gNB_Target, target UPF UPF_Target and target data network DN_Target.

A RAN handover is then performed from the source wireless access node gNB_Source to the target wireless access node gNB_Target, and data flows are moved by the applications from the first data session DS1 to the second data session DS2. The first data session DS1 is then released.

It is noted that 1) Establishment of a PDU session in dual radio connectivity mode is only possible when the target gNB signal is good enough. 2) Handover is performed according to the ordinary 3GPP procedure and typically happens when the source gNB signal decreases. 3) In a Single Connectivity scenario, the UPFs remain unchanged, as they act as the IP anchor point.

NWDAF Prediction Service

As described above, the NWDAF provides a mobility prediction service. The NWDAF allows multiple models. Which models that are used to achieve a service may vary over time. In one example, a "Mobility Prediction" model is provided.

The NWDAF exposes analytics services. E.g. a single service "UPF Area Change Prediction" service. Internally, this service uses the output from the "Mobility Prediction" trained model, typically a neural network based trained model.

Problems with Existing Solutions

An overall problem with AI-based mobility prediction solutions described above is that the results will never be 100% correct. Incorrect predictions may be expensive in terms of resources and processing time/power. In one example, an incorrect prediction may lead to the establishment of a new user plane path (second PDU session in the figures above) that later needs to be revoked. This may imply the setup of yet another user plane path (a third session), now via the correct gNB, and later moving flows to the correct user plane path.

In this disclosure we focus on step 211 in FIG. 2. There is an already existing standardized message "PDU Session Modification Command" in TS 23.502 version 16.2.0 section 4.3.5.2. This message may be extended with information for RAN to select the wireless access node/gNB/base station for the second PDU session. The message includes either the information "UPF instance x was picked by the SMF", or the information "Please pick gNB y". The case where the message includes the selected UPF it is assumed that RAN can map UFP instance/area to a gNB. For example, RAN can pick an gNB that is closest to the given UPF instance/area.

A problem arises when the predicted next/target gNB is not correct. The RAN may not be able to establish the second PDU session over the predicted next gNB, because the UE has no (or no good) signal quality to that next/target gNB.

The present disclosure propose a to include additional information to message 211 in FIG. 2. Instead of including just a single next gNB, the sender of the message (SMF in our case) includes a list of wireless access nodes or gNBs. A pre-requisite to this is that the NWDAF service provides a top-x list of predicted next gNB. In other words, NWDAF does not provide a single gNB that has the highest prediction probability (top-1), but it provides a list with the x gNBs having the highest prediction probability (top-x). In other words, the NWDAF presents a list of wireless access nodes most likely to be the target/next serving gNB.

When the RAN gNB_Source receives the top-x list, it requests the UE to do a measurement of the gNBs it sees. RAN compares the measurement list with the predicted top-x list and chooses/selects the best gNB that occurs in both lists based on a set of conditions or a set of predetermined conditions, e.g. UPF and/or gNB load. The choice/selection can be based on a simple policy or condition, e.g. "pick the best signal strength", or a more advanced policy including other parameters like load balancing.

RAN then informs the CN (SMF) about the selected gNB and establishes the second PDU session via that gNB. The SMF takes the selected gNB into account when selecting the UPF instance or UPF node.

When RAN informs the CN about the selected gNB it may provide a reason on why that gNB was selected. For example, because of signal strength or for load balancing purposes. This information may be used by the NWDAF to further tune (re-train) the mobility prediction model.

Figure 5:
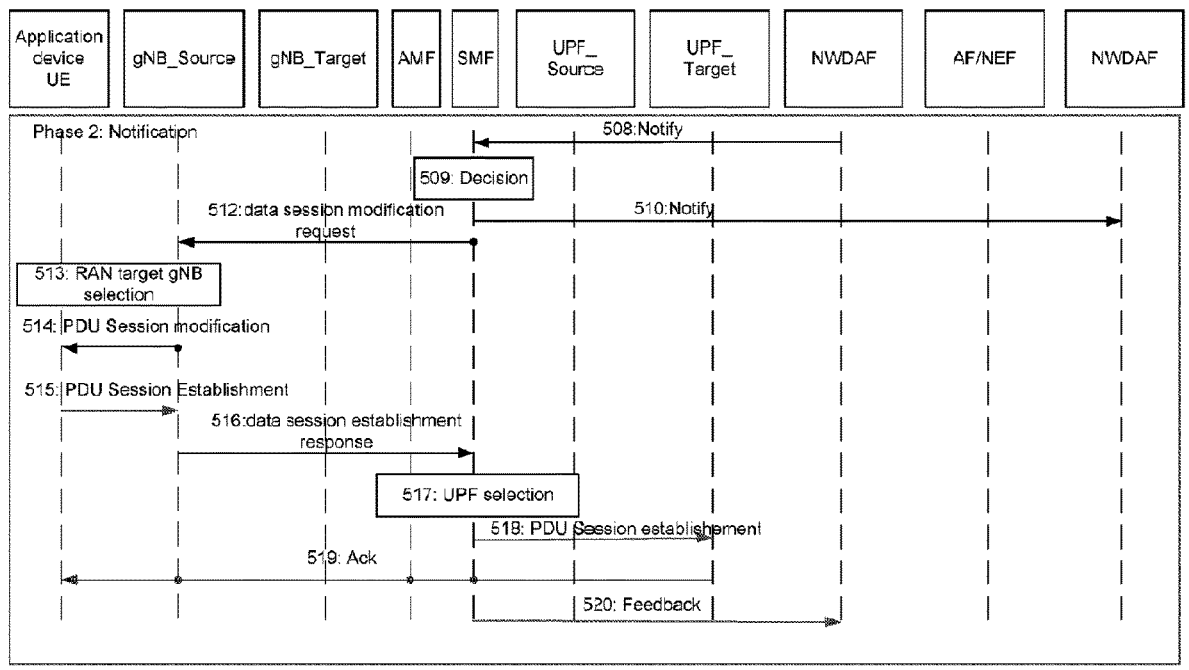
FIG. 5 Illustrates a method performed in the Notification phase according to one or more embodiments of the present disclosure.

FIG. 5 Illustrates a method performed in the Notification phase according to one or more embodiments of the present disclosure. FIG. 5 illustrates, to some parts, extended CN-RAN signaling. FIG. 5 is many parts based on FIG. 2. In embodiments, step 513 may alternatively be done between step 515 and 516.

Firstly, the NWDAF notifies 508 the SMF of a prediction of target/next gNB and/or target/next UPF. The indication is directly or indirectly indicative of a plurality of predicted target wireless access nodes indicated as potential target access nodes for the UE. E.g. directly indicated by a top-x list with the most likely candidates for being the next gNB or next UPF node, or a list of UPF areas each comprising a list of associated gNBs.

The top-x list provided to RAN may be a simple unsorted list of gNB identities. It may also include additional information like priorities or preferences assigned to each entry in the list (that may be based on the prediction probability received from NWDAF). The list may even include other data, like the predicted stay-time for each gNB in the list. RAN can later take that additional information into account when selecting gNB.

Next, the processing the SMF processes notification 509, and determines if connecting the UE to any of the plurality of predicted target wireless access nodes comprises a change to an associated geographical area different to the first geographical area UPF_area1. Optionally, the NWDAF is notified 510 of the result of the processing and/or determination in the previous step.

Besides adding additional information received from the NWDAF to the top-x list, the SMF may also process the notification by doing its own pre-processing of the list before sending it to RAN. For example, if the list from the NWDAF contains 10 candidates, and 8 out of 10 candidates are best served by one UPF instance, then the SMF may filter away the 2 candidates that are best served by other UPF instances. One reason for filtering away could be that the SMF (presumably based on info from the NWDAF) believes the UE is moving on a certain path where the removed candidates would represent a de-tour. Another example is load balancing. The SMF may filter out gNBs that are best served by UPF instances that already are overloaded, thereby forcing the RAN to choose a gNB that is best served by a UPF that still has free capacity.

Next, a data session modification request 512 comprising the processed notification is transmitted to the first wireless access node gNB_Source. The data session modification request is indicative of a request to transfer the at least one first data session to any of the plurality of predicted target wireless access nodes, i.e. the processed top-x list.

Next, a target gNB gNB_Target is selected 513 by the RAN/gNB from the plurality of target wireless access nodes based on a set of predetermined conditions. The set of predetermined conditions may e.g. include conditions indicative of preferences on signal strength, signal quality or maximum load.

Additionally, the RAN may internally also run local mobility prediction model/s. Such a model may have more detailed information on UE movement speed and direction then the NWDAF model has. This local mobility prediction model's output can be matched against the gNBs provided in the top-x to come to a better choice of gNB.

Special care should be taken when none of the gNBs in the top-x list are in the UE's measurement list, or when the RAN for one or other reason decides that none of the gNBs in the processed top-x list are good. In this case, RAN may send an error message back with a cause code to the CN/SMF. Such error message may also include a hint for an alternative gNB, or an alternative set of gNBs, that RAN believes would be a good choice (for example, the one with the best signal, or a set of gNBs with good signal and good/reasonable load level). This information may be forwarded by the SNF to the NWDAF to further tune the trained model. In FIG. 5, if the RAN finds that none of the wireless access nodes/gNBs are acceptable, this would mean that steps 514-519 would not be performed. Instead, RAN would send an error message back after step 513. Step 520 is still performed to send the feedback to the NWDAF.

The source wireless access node gNB_Source may then optionally send a PDU Session modification request 514 to the UE. This is essentially a forward of the data session modification request message 512. Of course, 512 also includes information only used by the gNB (e.g. the top-x list). That type of information will not be present in the PDU Session modification request 514. The PDU Session modification request 514 is the command to the UE to establish the second PDU session (515).

The UE may return with a PDU session Establishment response 515 sent to the source wireless access node gNB_Source.

The source wireless access node gNB_Source may then receive the response 515 from the UE and send a PDU session Establishment response 516 to the SMF. The PDU session Establishment response 516 may comprise the selected wireless access node gNB_Target, where the selected wireless access node gNB_Target is associated to a second geographical area UPF_area2.

The SMF may then perform UPF selection 517. In other words, the SMF may accept or reject the selected wireless access node/gNB comprised in the PDU session Establishment response 516.

If the SMF rejects the proposal/selected wireless access node/gNB from RAN in step 516, it can skip step 517 and 518, and immediately provide a not-ack in step 519. Special care should be taken when none of the gNBs in the top-x list are in the UE's measurement list, or when RAN for another reason decides that none of the gNBs in the top-x list are good or acceptable. In this case, RAN may send an error message back with a cause code to the CN. Such error message may also include a hint for an alternative gNB, or an alternative set of gNBs, that RAN believes would be a good choice (for example, the one with the best signal, or a set of gNBs with good signal and good/reasonable load level). This information may be forwarded to the NWDAF to tune the model. In the chart above, this would mean that steps 514-519 would not be performed. Instead, the RAN or target gNB or source gNB would send an error message back after step 513. Step 520 is still performed to send the feedback to the NWDAF.

If the SMF does accept the proposal/elected wireless access node/gNB from RAN in step 516, then the SMF configures the UPF by performing step 518.

Regardless of the SMF rejects or accepts the proposal/elected wireless access node/gNB, feedback comprising the proposal/selected wireless access node/gNB and the decision is sent to the NWDAF to further improve and train the trained model.

Figure 6A:
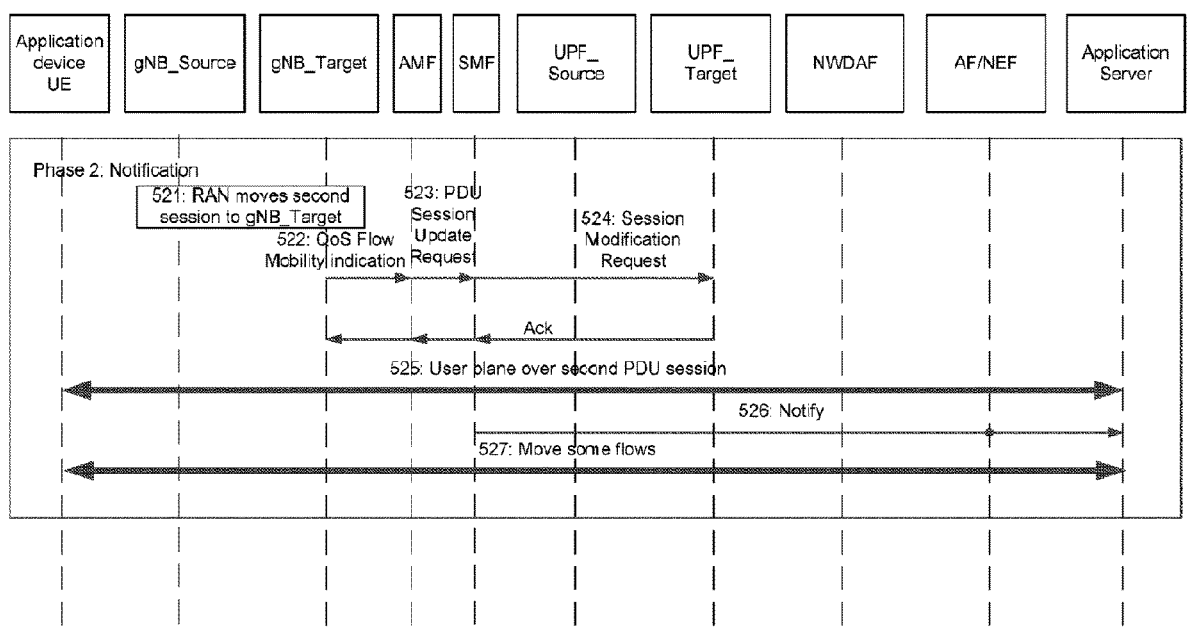
FIG. 6A-B Illustrates further steps of the method in FIG. 5 according to one or more embodiments of the present disclosure.
Figure 6B:
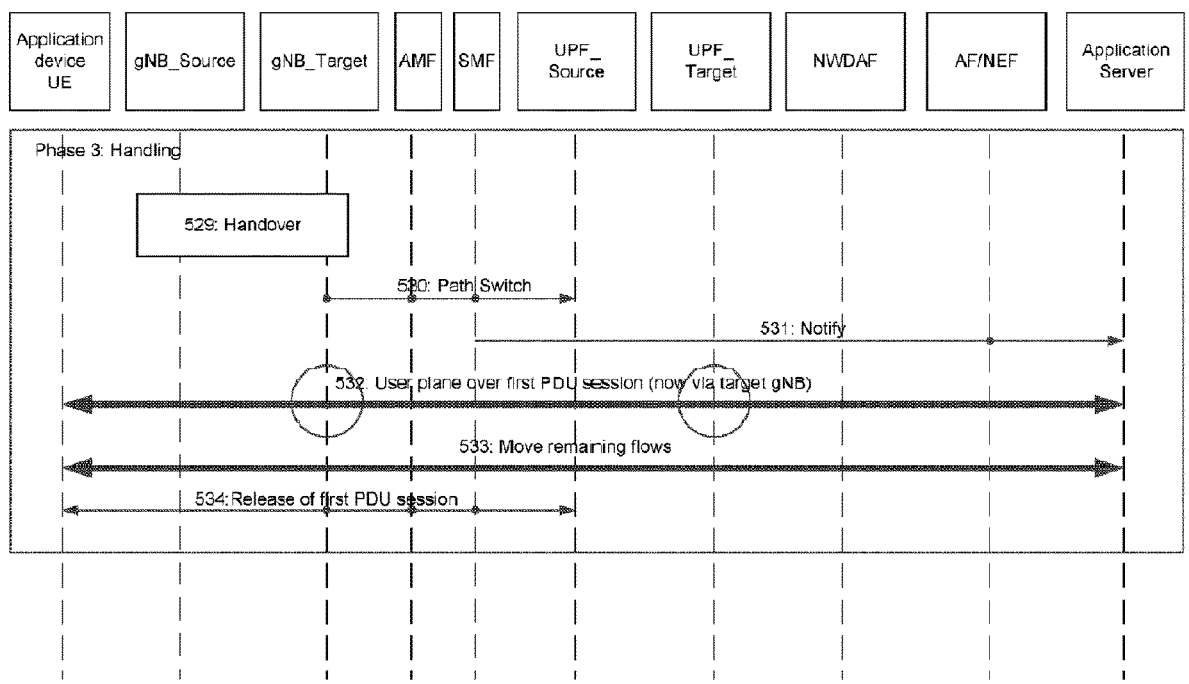

The next subsequent steps of the method is described in relation to FIG. 6A-B.

FIG. 6A-B Illustrates further steps of the method in FIG. 5 according to one or more embodiments of the present disclosure.

If the selected wireless access node/gNB from RAN has been accepted by the SNF, the method continues with:

Moving 521 the second data session to the selected and accepted target wireless access node gNB_Target.

Sending 522, by the target wireless access node gNB_Target, a QoS Flow Mobility indication to the AMF.

Sending 523, by the AMF, a PDU Session Update Request, to the SMF.

Sending 524, by the SMF, a Session Modification Request to the target UPF UPF_Target, i.e. the UPF node serving or associated with the UPF area associated to the selected and accepted target wireless access node gNB_Target.

If successful, an ack is sent back in the chain UPF_Target->SMF->AMF->gNB_Target.

A User Plane is then established 525 over the second PDU session.

The SMF then sends a notification 526 to the application server, indicating that the second data session is established.

The application server then proceeds and moves 527 some data flows.

FIG. 6B illustrates how the third phase is then performed, as further described in relation to FIG. 3.

Figure 7:
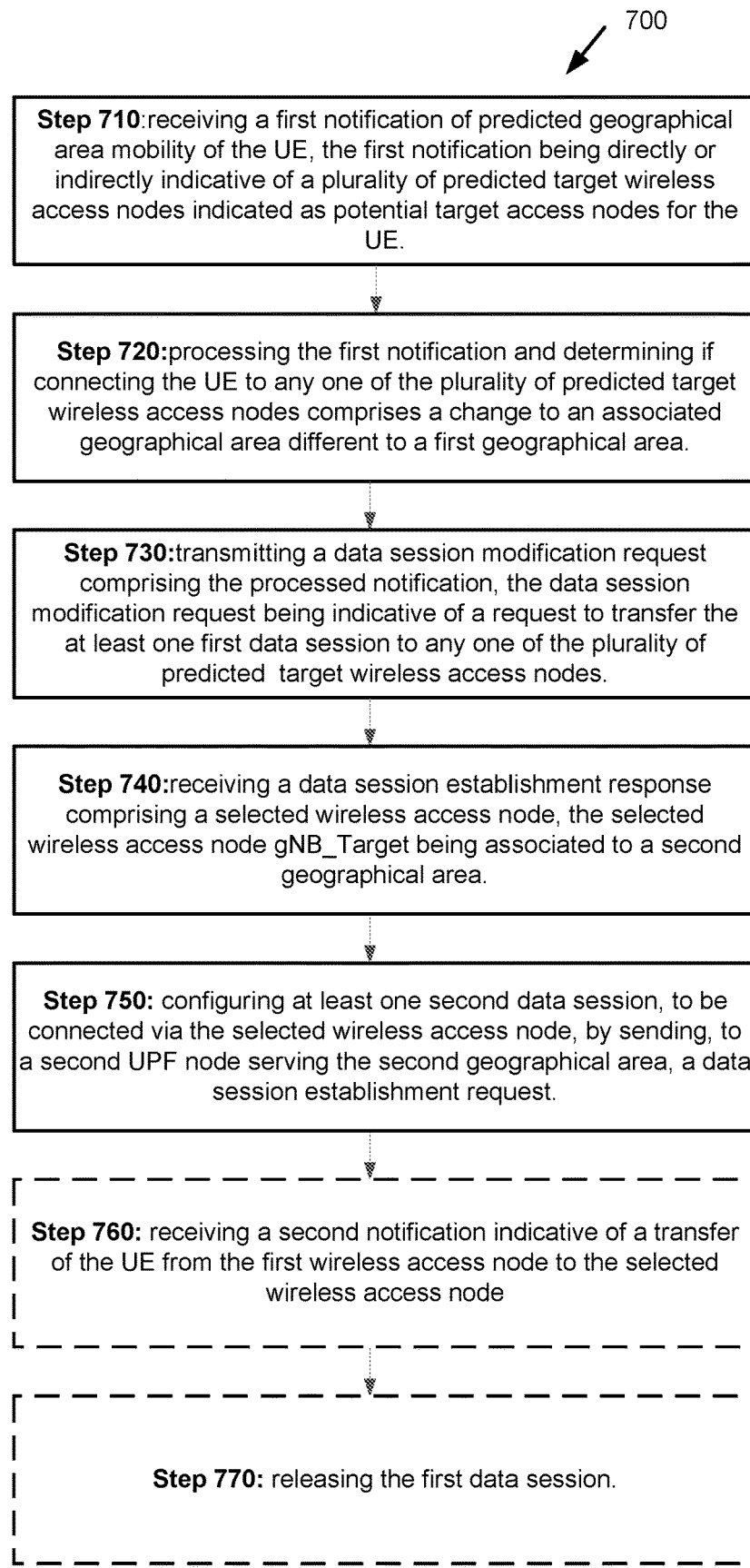
FIG. 7 shows a flowchart of a method performed by a control node according to one or more embodiments of the present disclosure.

FIG. 7 shows a flowchart of a method 700 performed by a control node according to one or more embodiments of the present disclosure. The method is performed by the control node SMF which is configured to configure data sessions for a user equipment, UE. At least one first data session is established via first User Plane Function, UPF, node and the first data session is connected via a first wireless access node gNB_Source. The first wireless access node gNB_Source may be associated to a first geographical area UPF_area1 of the first UPF node. The method comprises:

Step 710: receiving, from a service node NWDAF, a first notification 508 of predicted geographical area mobility of the UE, the first notification 508 being directly or indirectly indicative of a plurality of predicted target wireless access nodes indicated as potential target access nodes for the UE.

The notification is typically received in a signal transmitted from the NWDAF to the control node SNF. The first notification 508, received, from the service node NWDAF, indicates directly typically by indicating a list of access nodes. The first notification 508, received, from the service node NWDAF, indicates indirectly by indicating a list of geographical areas, each geographical area comprising a User Plane Function, UPF, area and being associated to a corresponding list of wireless access nodes. As mentioned previously, each wireless access node is comprised by and/or associated with one or more UPF areas served by a corresponding UPF node.

Step 720: processing the first notification 509 and determining if connecting the UE to any one of the plurality of predicted target wireless access nodes comprises a change to an associated geographical area different to the first geographical area UPF_area1.

In one embodiment, the processing 509 of the first notification comprises generating a processed notification by filtering the plurality of predicted target wireless access nodes using a set of predetermined conditions.

In one embodiment, the predetermined conditions comprise allowed load thresholds for UPF nodes and/or target wireless access nodes, wherein the filtering comprises removing UPF nodes and/or target wireless access nodes having a load greater than the allowed load thresholds given by the predetermined conditions.

Additionally or alternatively, the predetermined conditions comprise allowed load thresholds for UPF nodes and/or target wireless access nodes, wherein the filtering comprises removing UPF nodes and/or target wireless access nodes having a load greater than the allowed load thresholds given by the predetermined conditions.

Step 730: transmitting, to the first wireless access node gNB_Source, a data session modification request 512 comprising the processed notification, the data session modification request being indicative of a request to transfer the at least one first data session to any one of the plurality of predicted target wireless access nodes, Step 740: receiving, from the first wireless access node gNB_Source, a data session establishment response, optionally comprising a selected wireless access node gNB_Target. The selected wireless access node gNB_Target is optionally associated to a second geographical area UPF_area2.

In a first example, the RAN finds one of the plurality of predicted target wireless access nodes acceptable and selects one wireless access node from the plurality of predicted target wireless access nodes.

In a second example, the RAN finds none of the plurality of predicted target wireless access nodes acceptable and selects one wireless access node from an alternative set of wireless access nodes. E.g. deemed as suitable wireless access nodes based on radio measurements.

Step 750: configuring at least one second data session, to be connected via the selected wireless access node gNB_Target, by sending, to a second User Plane Function, UPF node serving the second geographical area UPF_area2, a data session establishment request.

The method may further comprise the following optional steps:

Step 760: receiving, from the selected wireless access node gNB_Target, a second notification 526 indicative of a transfer of the UE from the first wireless access node gNB_Source to the selected wireless access node gNB_Target.

Step 770: releasing the first data session.

In one embodiment, the method according to any of the preceding claims, further comprises sending feedback to the service node NWDAF. The feedback may be indicative of the selected wireless access node gNB_Target from plurality of target wireless access nodes.

This feedback may be used to improve or train the trained model further.

Figure 8:
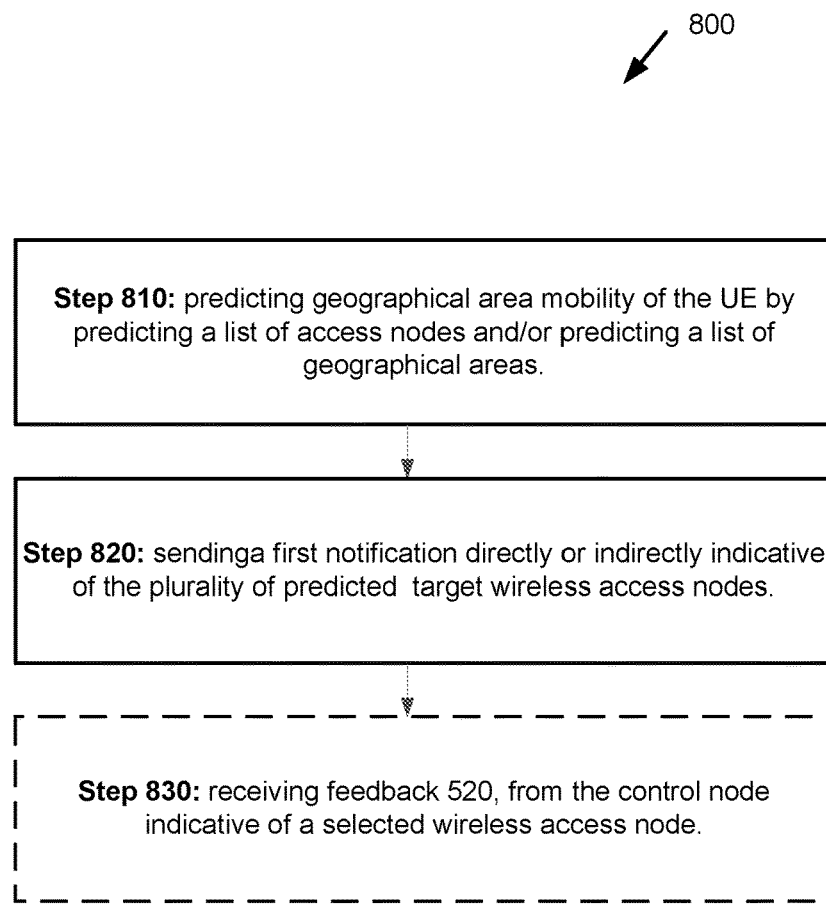
FIG. 8 shows a flowchart of a method performed by a service node according to one or more embodiments of the present disclosure.

FIG. 8 shows a flowchart of a method performed by a service node NWDAF according to one or more embodiments of the present disclosure. The method is performed by service node NWDAF which is configured to predict mobility of a user equipment, UE, between geographical areas UPF_area1, UPF_area2. The method comprises:

Step 810: predicting, by the service node NWDAF, geographical area mobility of the UE by predicting a list of access nodes and/or predicting a list of geographical areas. Each geographical area comprises a User Plane Function, UPF, area and is associated to a corresponding list of wireless access nodes. The predicted list of wireless access nodes or the corresponding list of access nodes are indicated as potential target access nodes for the UE, wherein the predicting is performed using a trained model.

Step 820: sending, to the control node SMF, a first notification 508 directly or indirectly indicative of the plurality of predicted target wireless access nodes.

In one embodiment, the method further comprises Step 830 receiving feedback 520, from the control node SMF, indicative of a selected wireless access node gNB_Target.

In a first example, the RAN finds one wireless access node of the plurality of predicted target wireless access nodes acceptable and selects one wireless access node from the plurality of predicted target wireless access nodes.

In a second example, the RAN finds none of the plurality of predicted target wireless access nodes acceptable and selects one wireless access node from an alternative set of wireless access nodes. E.g. deemed as suitable wireless access nodes based on radio measurements.

Selection from an alternative set of wireless access nodes is further described in relation to FIG. 5.

Figure 9:
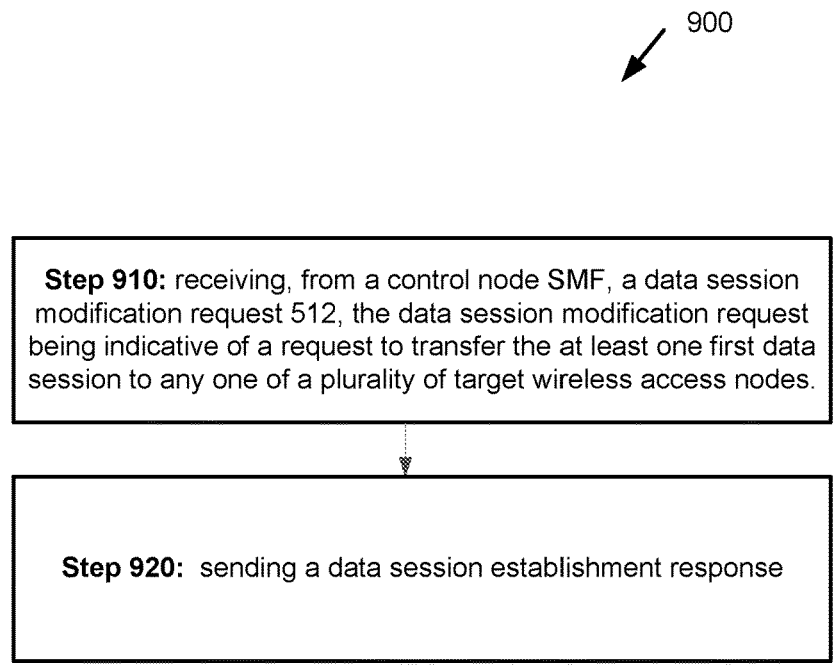
FIG. 9 shows a flowchart of a method performed by a wireless access node according to one or more embodiments of the present disclosure.

FIG. 9 shows a flowchart of a method 900 performed by a wireless access node gNB_Source according to one or more embodiments of the present disclosure. The method is performed by the wireless access node gNB_Source configured to connect to a user equipment, UE. The wireless access node gNB_Source is associated to a first geographical area UPF_area1, typically a UPF area. The method comprises:

Step 910: receiving, from a control node SMF, a data session modification request 512, the data session modification request being indicative of a request to transfer the at least one first data session to any one of a plurality of target wireless access nodes.

Step 920: sending a data session establishment response.

In one embodiment, the UE evaluates each of the plurality of target wireless access nodes using a set of conditions to see if it is a viable candidates for a handover. Examples of such conditions are that a target wireless access node is present in a in the UE's measurement list, that a target wireless access node is not overloaded etc. In this embodiment, the method 900 further comprises selecting a target wireless access node gNB_Target from the plurality of target wireless access nodes based on a set of conditions, wherein the data session establishment response comprises the selected wireless access node gNB_Target.

In one embodiment, and after selecting the target wireless access node gNB, the method further comprises transferring the UE from the first wireless access node gNB_Source to the selected wireless access node gNB_Target, sending a notification 530 indicative of the transfer of the UE from the first wireless access node gNB_Source to the selected wireless access node gNB_Target.

In one alternative embodiment, the UE evaluates that none of the plurality of target wireless access nodes are viable candidates for a handover using the set of conditions. The method then further comprises concluding that no target wireless access node (gNB_Target) from the plurality of target wireless access nodes matches a set of conditions, generating an error indication, wherein the data session establishment response further comprises the error indication.

Figure 10:
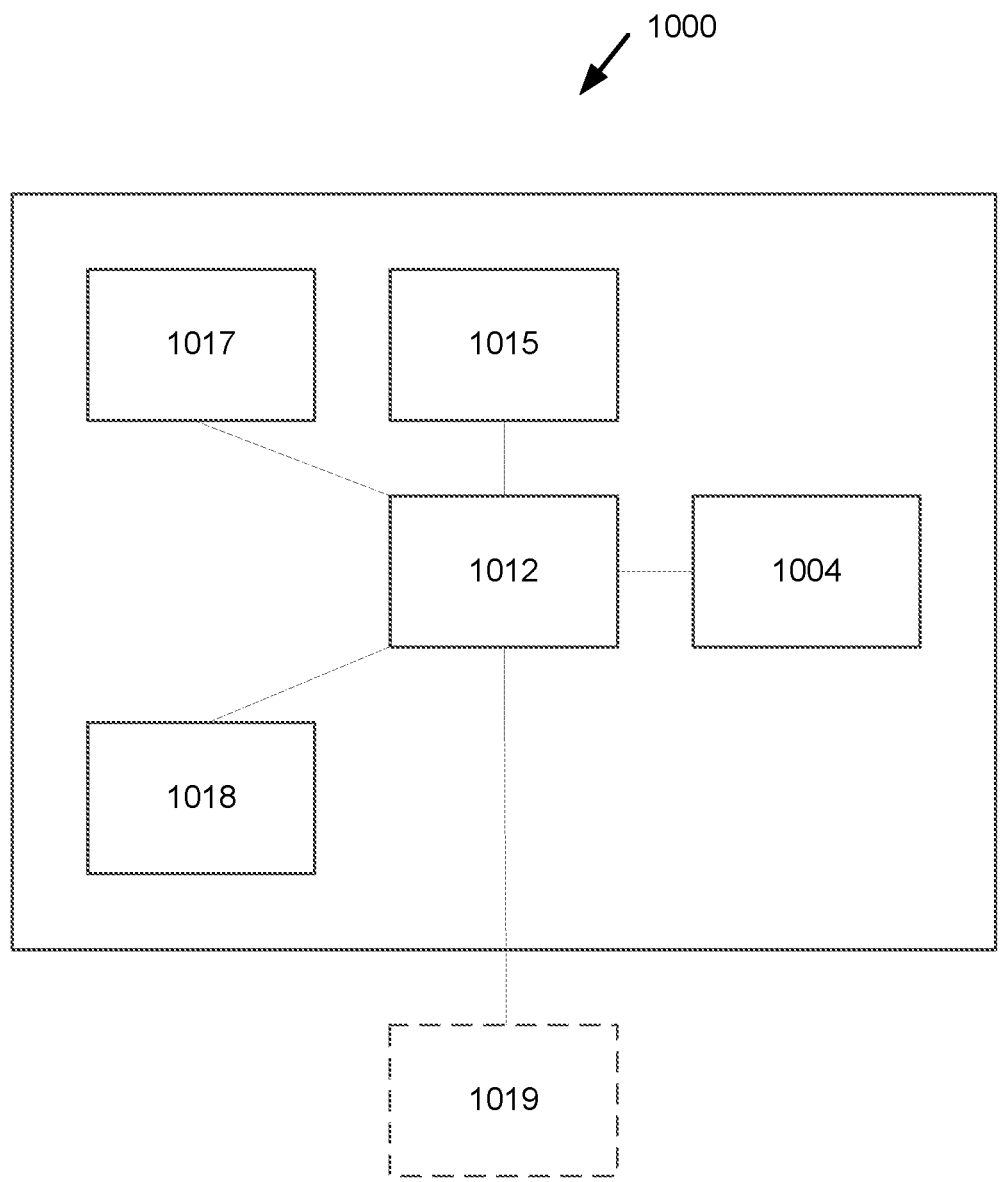
FIG. 10 shows details of a computer device according to one or more embodiments of the present disclosure.

FIG. 10 shows details of a computer device 1000 according to one or more embodiments. The computer device 1000 may be in the form of a selection of any of network node, a desktop computer, server, laptop, mobile device, a smartphone, a tablet computer, a smart-watch etc. The computer device 1000 may comprise processing circuitry 1012. The computer device 1000 may optionally comprise a communications interface 1004 for wired and/or wireless communication. Further, the computer device 1000 may further comprise at least one optional antenna (not shown in figure). The antenna may be coupled to a transceiver of the communications interface 1004 and is configured to transmit and/or emit and/or receive a wireless signals in a wireless communication system.

In one example, the processing circuitry 1012 may be any of a selection of processor and/or a central processing unit and/or processor modules and/or multiple processors configured to cooperate with each-other. Further, the computer device 1000 may further comprise a memory 1015. The memory 1015 may contain instructions executable by the processing circuitry 1012, that when executed causes the processing circuitry 1012 to perform any of the methods and/or method steps described herein.

The communications interface 1004, e.g. the wireless transceiver and/or a wired/wireless communications network adapter, which is configured to send and/or receive data values or parameters as a signal to or from the processing circuitry 1012 to or from other external nodes In an embodiment, the communications interface 1004 communicates directly between nodes or via a communications network.

In one or more embodiments the computer device 1000 may further comprise an input device 1017, configured to receive input or indications from a user and send a user-input signal indicative of the user input or indications to the processing circuitry 1012.

In one or more embodiments the computer device 1000 may further comprise a display 1018 configured to receive a display signal indicative of rendered objects, such as text or graphical user input objects, from the processing circuitry 1012 and to display the received signal as objects, such as text or graphical user input objects.

In one embodiment the display 1018 is integrated with the user input device 1017 and is configured to receive a display signal indicative of rendered objects, such as text or graphical user input objects, from the processing circuitry 1012 and to display the received signal as objects, such as text or graphical user input objects, and/or configured to receive input or indications from a user and send a user-input signal indicative of the user input or indications to the processing circuitry 1012.

In one or more embodiments the computer device 1000 may further comprise one or more sensors 1019.

In embodiments, the processing circuitry 1012 is communicatively coupled to the memory 1015 and/or the communications interface 1004 and/or the input device 1017 and/or the display 1018 and/or the one or more sensors 419.

In embodiments, the communications interface and/or transceiver 1004 communicates using wired and/or wireless communication techniques.

In embodiments, the one or more memory 1015 may comprise a selection of a hard RAM, disk drive, a floppy disk drive, a magnetic tape drive, an optical disk drive, a CD or DVD drive (R or RW), or other removable or fixed media drive.

In a further embodiment, the computer device 1000 may further comprise and/or be coupled to one or more additional sensors (not shown) configured to receive and/or obtain and/or measure physical properties pertaining to the computer device or the environment of the computer device, and send one or more sensor signals indicative of the physical properties to the processing circuitry 1012.

It is to be understood that a computer device comprises any suitable combination of hardware and/or software needed to perform the tasks, features, functions and methods disclosed herein. Moreover, while the components of the computer device are depicted as single boxes located within a larger box, or nested within multiple boxes, in practice, a computer device may comprise multiple different physical components that make up a single illustrated component (e.g., memory 1015 may comprise multiple separate hard drives as well as multiple RAM modules).

Similarly, the computer device 1000 may be composed of multiple physically separate components, which may each have their own respective components.

The communications interface 1004 may also include multiple sets of various illustrated components for different wireless technologies, such as, for example, GSM, WCDMA, LTE, NR, WiFi, or Bluetooth wireless technologies. These wireless technologies may be integrated into the same or different chip or set of chips and other components within the computer device 1000.

Processing circuitry 1012 is configured to perform any determining, calculating, or similar operations (e.g., certain obtaining operations) described herein as being provided by a computer device 1000. These operations performed by processing circuitry 1012 may include processing information obtained by processing circuitry 1012 by, for example, converting the obtained information into other information, comparing the obtained information or converted information to information stored in the network node, and/or performing one or more operations based on the obtained information or converted information, and as a result of said processing making a determination.

Processing circuitry 1012 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other computer device 1000 components, such as device readable medium, computer 1000 functionality. For example, processing circuitry 1012 may execute instructions stored in device readable medium 1015 or in memory within processing circuitry 1012. Such functionality may include providing any of the various wireless features, functions, or benefits discussed herein. In some embodiments, processing circuitry 1012 may include a system on a chip.

In some embodiments, processing circuitry 1012 may include one or more of radio frequency, RF, transceiver circuitry and baseband processing circuitry. In some embodiments, RF transceiver circuitry and baseband processing circuitry may be on separate chips or sets of chips, boards, or units, such as radio units and digital units. In alternative embodiments, part or all of RF transceiver circuitry and baseband processing circuitry may be on the same chip or set of chips, boards, or units In certain embodiments, some or all of the functionality described herein as being provided by a computer device 1000 may be performed by the processing circuitry 1012 executing instructions stored on device readable medium 1015 or memory within processing circuitry 1012. In alternative embodiments, some or all of the functionality may be provided by processing circuitry 1012 without executing instructions stored on a separate or discrete device readable medium, such as in a hard-wired manner. In any of those embodiments, whether executing instructions stored on a device readable storage medium or not, processing circuitry 1012 can be configured to perform the described functionality. The benefits provided by such functionality are not limited to processing circuitry 1012 alone or to other components of computer device 1000, but are enjoyed by computer device 1000 as a whole, and/or by end users.

Device readable medium or memory 1015 may comprise any form of volatile or non-volatile computer readable memory including, without limitation, persistent storage, solid-state memory, remotely mounted memory, magnetic media, optical media, random access memory (RAM), readonly memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1012. Device readable medium 1015 may store any suitable instructions, data or information, including a computer program, software, an application including one or more of logic, rules, code, tables, etc. and/or other instructions capable of being executed by processing circuitry 1012 and, utilized by computer device 1000. Device readable medium QQ180 may be used to store any calculations made by processing circuitry 1012 and/or any data received via interface 1004. In some embodiments, processing circuitry 1012 and device readable medium 1015 may be considered to be integrated.

The communications interface 1004 is used in the wired or wireless communication of signaling and/or data between computer device 1000 and other nodes. Interface 1004 may comprise port(s)/terminal(s) to send and receive data, for example to and from computer device 1000 over a wired connection. Interface 1004 also includes radio front end circuitry that may be coupled to, or in certain embodiments a part of, an antenna. Radio front end circuitry may comprise filters and amplifiers. Radio front end circuitry may be connected to the antenna and/or processing circuitry 1012.

Examples of a computer device 1000 include, but are not limited to, a smart phone, a mobile phone, a cell phone, a voice over IP (VoIP) phone, a wireless local loop phone, a tablet computer, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

The communication interface may 1004 encompass wired and/or wireless networks such as a local-area network (LAN), a wide-area network (WAN), a computer network, a wireless network, a telecommunications network, another like network or any combination thereof. The communication interface may be configured to include a receiver and a transmitter interface used to communicate with one or more other devices over a communication network according to one or more communication protocols, such as Ethernet, TCP/IP, SONET, ATM, optical, electrical, and the like). The transmitter and receiver interface may share circuit components, software or firmware, or alternatively may be implemented separately.

In one embodiment, a computer device 1000 is provided and is configured to perform any of the method steps described herein.

In one embodiment, computer device 1000 comprises any one of the application device/UE, the gNB_Dource, the gNB_Target, the AMF, the SNF, the UPF_Source, the UPF_Target, the NWDAFm the AF/NEF or the application server.

In one embodiment, each of the application device/UE, the gNB_Dource, the gNB_Target, the AMF, the SNF, the UPF_Source, the UPF_Target, the NWDAFm the AF/NEF or the application server comprises all or a selection of the features of the computer device 1000 described in relation to FIG. 10.

In one embodiment, a computer program is provided and comprises computer-executable instructions for causing a computer device, when the computer-executable instructions are executed on a processing unit comprised in the computer device, to perform any of the method steps described herein.

In one embodiment, a computer program product is provided and comprises a computer-readable storage medium, the computer-readable storage medium having the computer program above embodied therein.

In one embodiment, a carrier is provided and contains the computer program above. The carrier may be any one of an electronic signal, an optical signal, a radio signal, or a computer readable storage medium.

Finally, it should be understood that the invention is not limited to the embodiments described above, but also relates to and incorporates all embodiments within the scope of the appended independent claims.

The invention claimed is:

1. A method performed by a control node configured to configure data sessions for a user equipment, UE, wherein at least one first data session is established via a first User Plane Function, UPF, node and the first data session is connected via a first wireless access node associated to a first geographical area of the first UPF node, the method comprising:
   receiving, from a service node, a first notification of predicted geographical area mobility of the UE, the first notification being directly or indirectly indicative of a plurality of predicted target wireless access nodes indicated as potential target access nodes for the UE,
   processing the first notification, and determining if connecting the UE to any one of the plurality of predicted target wireless access nodes comprises a change to an associated geographical area different to the first geographical area,
   transmitting, to the first wireless access node, a data session modification request comprising the processed first notification, the data session modification request being indicative of a request to transfer the at least one first data session to any one of the directly or indirectly indicated target wireless access nodes,
   receiving, from the first wireless access node, a data session establishment response comprising a selected wireless access node of the plurality of predicted target wireless access nodes, the selected wireless access node being associated to a second geographical area,
   configuring at least one second data session, to be connected via the selected wireless access node, by sending, to a second User Plane Function, UPF node serving the second geographical area, a data session establishment request,
   receiving, from the selected wireless access node, a second notification indicative of a transfer of the UE from the first wireless access node to the selected wireless access node, and
   releasing the first data session.

2. The method according to claim 1, wherein the first notification, received, from the service node, indicates directly by indicating a list of access nodes and/or indicates indirectly by indicating a list of geographical areas, each geographical area comprising a User Plane Function, UPF, area and being associated to a corresponding list of access nodes.

3. The method according to claim 1, wherein processing the first notification comprises generating a processed notification by filtering the plurality of predicted target wireless access nodes using a set of predetermined conditions.

4. The method according to claim 3, wherein the predetermined conditions comprise allowed load thresholds for UPF nodes and/or target wireless access nodes, wherein the filtering comprises removing UPF nodes and/or target wireless access nodes having a load greater than the allowed load thresholds given by the predetermined conditions.

5. The method according to claim 1, further comprising sending feedback, to the service node, indicative of a selected wireless access node from plurality of target wireless access nodes.

6. The method according to claim 1, further comprising:
concluding that no target wireless access node from the plurality of target wireless access nodes matches a set of conditions,
generating an error indication,
wherein the data session establishment response further comprises the error indication.

7. A control node configured to configure data sessions for a user equipment, UE, wherein at least one first data session is established by a first User Plane Function, UPF, node and the first data session is connected via a first wireless access node (gNB_Source) associated to a first geographical area of the first UPF node, the control node comprising:
processing circuitry,
a memory comprising instructions executable by the processing circuitry, causing the processing circuitry to:
receive, from a service node, a first notification of predicted geographical area mobility of the UE, the first notification being directly or indirectly indicative of a plurality of predicted target wireless access nodes indicated as potential target access nodes for the UE,
process the first notification, and determining if connecting the UE to any one of the plurality of predicted target wireless access nodes comprises a change to an associated geographical area different to the first geographical area,
transmit, to the first wireless access node, a data session modification request comprising the processed first notification, the data session modification request being indicative of a request to transfer the at least one first data session to any one of the plurality of predicted target wireless access nodes,
receive, from the first wireless access node, a data session establishment response comprising a selected wireless access node of the plurality of predicted target wireless access nodes, the selected wireless access node being associated to a second geographical area,
configure at least one second data session, to be connected via the selected wireless access node, by sending, to a second User Plane Function, UPF node serving the second geographical area, a data session establishment request,
receive, from the selected wireless access node, a second notification indicative of a transfer of the UE from the first wireless access node to the selected wireless access node, and
release the first data session.

8. The control node according to claim 7, wherein the first notification, received, from the service node, indicates directly by indicating a list of access nodes and/or indicates indirectly by indicating a list of geographical areas, each geographical area comprising a User Plane Function, UPF, area and being associated to a corresponding list of access nodes.

9. The control node according to claim 7, wherein the processing circuitry is caused to process the first notification by generating a processed notification by filtering the plurality of predicted target wireless access nodes using a set of predetermined conditions.

10. The control node according to claim 9, wherein the predetermined conditions comprise allowed load thresholds for UPF nodes and/or target wireless access nodes, wherein the filtering comprises removing UPF nodes and/or target wireless access nodes having a load greater than the allowed load thresholds given by the predetermined conditions.

11. The control node according to claim 7, wherein the processing circuitry is further caused to send feedback, to the service node, indicative of a selected wireless access node from plurality of target wireless access nodes.

12. A wireless access node configured to connect to a user equipment, UE, the wireless access node being associated to a first geographical area, the wireless access node comprising:
processing circuitry,
a memory comprising instructions executable by the processing circuitry, causing the processing circuitry to:
receive, from a control node, a data session modification request, the data session modification request being indicative of a request to transfer the at least one first data session to any of a plurality of target wireless access nodes,
upon determining a target wireless access node from the plurality of target wireless access nodes based on a set of conditions,
send a data session establishment response, wherein the data session establishment response comprises the selected wireless access node,
transfer the UE from the first wireless access node to the selected wireless access node, and
send a notification indicative of the transfer of the UE from the first wireless access node to the selected wireless access node; and
upon determining that no target wireless access node from the plurality of target wireless access nodes matches a set of conditions,
generate an error indication, wherein the data session establishment response further comprises the error indication.

* * * * *